US009416553B2

(12) United States Patent
Horvath

(10) Patent No.: US 9,416,553 B2
(45) Date of Patent: Aug. 16, 2016

(54) CARGO CONTAINER FOR HOLDING A STORAGE BOX AND METHOD FOR TRANSPORTING THE STORAGE BOX UTILIZING THE CARGO CONTAINER

(71) Applicant: Arbor Valley Holdings, LLC, Ann Arbor, MI (US)

(72) Inventor: Robert C. Horvath, Ann Arbor, MI (US)

(73) Assignee: Arbor Valley Holdings, LLC, Ann Arbor, MI (US)

(*) Notice: Subject to any disclaimer, the term of this patent is extended or adjusted under 35 U.S.C. 154(b) by 0 days.

(21) Appl. No.: 14/720,667

(22) Filed: May 22, 2015

(65) Prior Publication Data
US 2015/0259939 A1 Sep. 17, 2015

Related U.S. Application Data

(63) Continuation-in-part of application No. 14/295,371, filed on Jun. 4, 2014.

(60) Provisional application No. 61/831,239, filed on Jun. 5, 2013.

(51) Int. Cl.
*A47F 10/00* (2006.01)
*E04H 1/12* (2006.01)
*E04H 1/00* (2006.01)
*G06Q 30/04* (2012.01)
*B65D 90/00* (2006.01)
*E05G 1/00* (2006.01)

(52) U.S. Cl.
CPC .............. *E04H 1/1222* (2013.01); *A47F 10/00* (2013.01); *B65D 90/0073* (2013.01); *E04H 1/00* (2013.01); *G06Q 30/04* (2013.01); *E05G 1/00* (2013.01)

(58) Field of Classification Search
CPC ..... B65D 5/0095; B65D 88/12; E04H 1/1222; A47F 10/00
USPC .................................. 186/33, 52, 59
See application file for complete search history.

(56) References Cited

U.S. PATENT DOCUMENTS

| 3,889,743 A * | 6/1975 | Presnick ............. B65D 81/052 165/46 |
| 4,109,876 A * | 8/1978 | Kratochvil, Jr. ....... A47C 31/11 206/326 |
| 2007/0170671 A1* | 7/2007 | Safari .................... B62B 1/125 280/47.26 |
| 2009/0308693 A1* | 12/2009 | Johnson, Jr. .......... E04H 1/1222 186/52 |
| 2011/0253590 A1* | 10/2011 | Lemola ................. B65D 19/18 206/600 |
| 2011/0313811 A1* | 12/2011 | Urban ................... B60P 3/0257 705/7.25 |
| 2012/0279896 A1* | 11/2012 | Lantz ..................... B65D 25/16 206/584 |
| 2014/0007787 A1* | 1/2014 | Caballer Barat .......... F42B 4/20 102/357 |

* cited by examiner

*Primary Examiner* — Mark Beauchaine
(74) *Attorney, Agent, or Firm* — Bucket Patent & Trademark Law Firm, PC; John F. Buckert

(57) ABSTRACT

A cargo container is provided. The cargo container includes a cargo container housing that defines an interior region. The cargo container further includes a shelving unit disposed in the interior region. The shelving unit has first and second shelf members spaced apart from one another, and a shelf liner disposed on the first shelf member. The shelving unit further includes a shelf liner and an inflatable cushion. The inflatable cushion that is disposed in the storage region of the shelf liner and adapted to contact a storage box and a second shelf member when the inflatable cushion has an inflated state such that the inflatable cushion applies a downward force on the storage box to prevent movement of the storage box during movement of the cargo container housing.

14 Claims, 20 Drawing Sheets

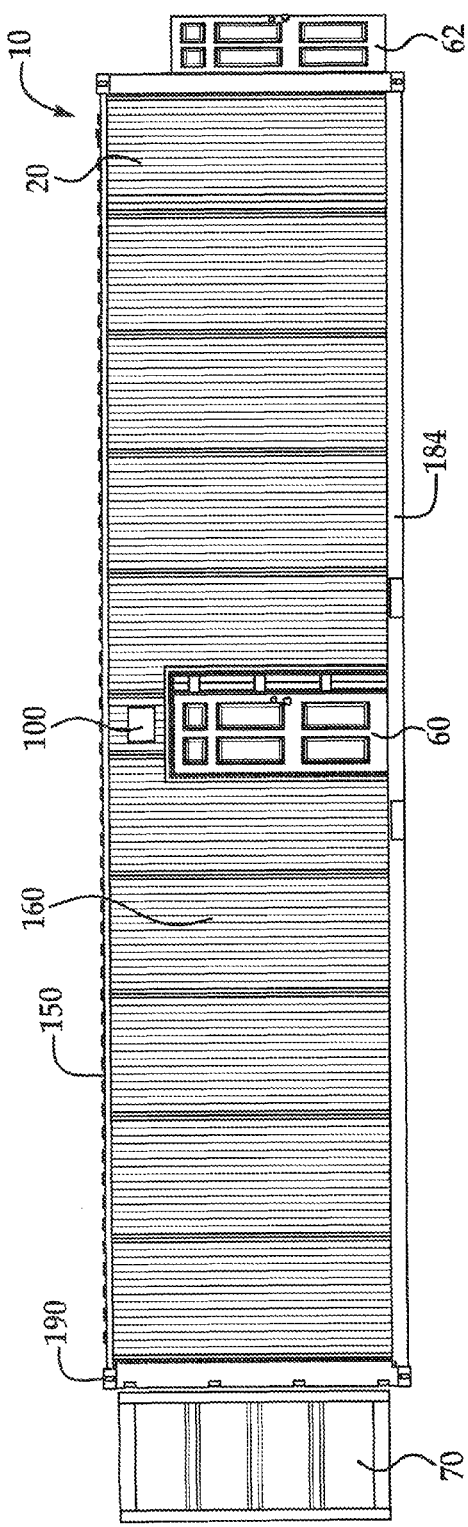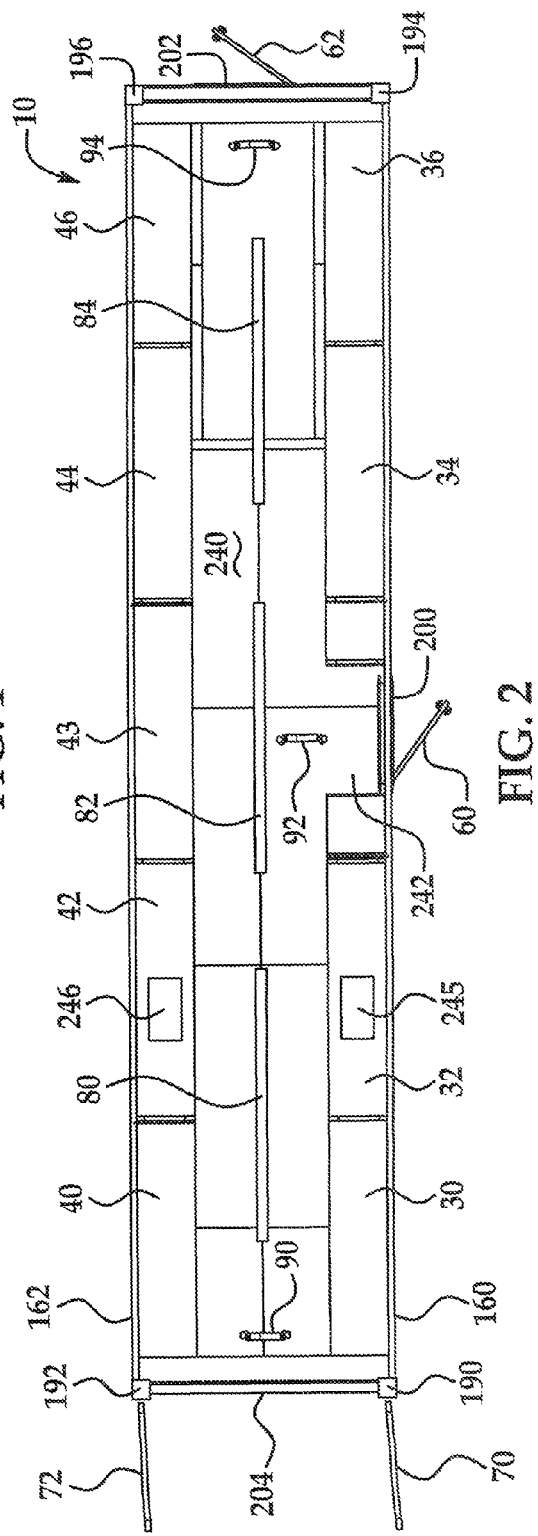
FIG. 1
FIG. 2

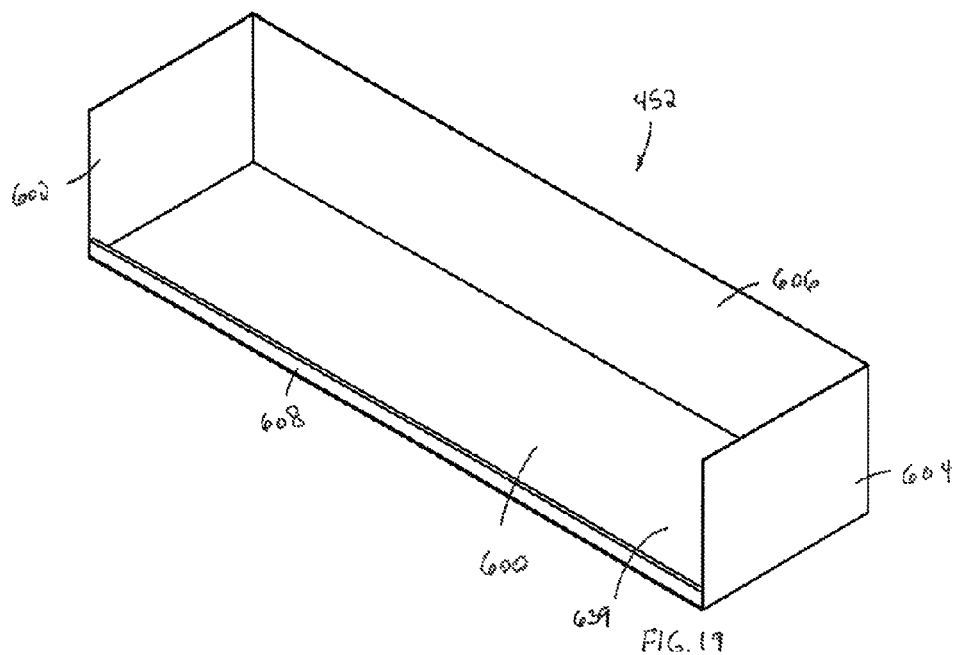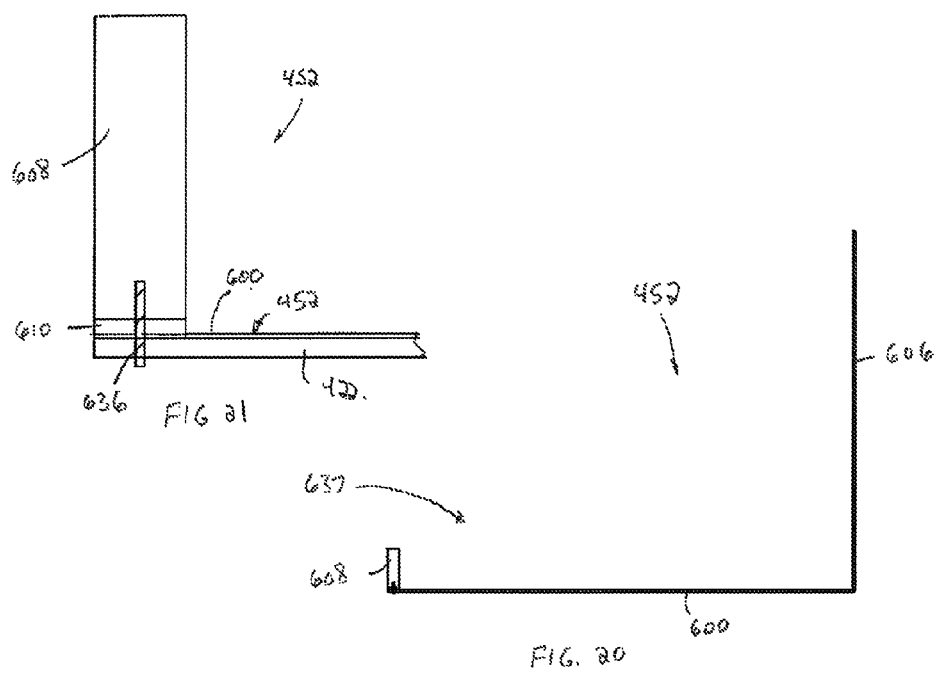

| User provides a cargo container housing defining an interior region and having a first consumer entrance extending therethrough | — 75a |

| User provides a shelving unit disposed in the interior region such that a longitudinally extending aisle is located proximate to the shelving unit in the interior region; the shelving unit having first and second shelf members spaced apart from one another, the shelving unit further includes a shelf liner and an inflatable cushion; the shelf liner being disposed on the first shelf member, the shelf liner having a bottom corrugated cardboard wall, first and second corrugated cardboard side walls, a rear corrugated cardboard wall, and a front wall; the shelf liner defining a storage region for holding the first storage box therein; the first and second corrugated cardboard side walls being disposed on opposite ends of the bottom corrugated cardboard wall and extending substantially parallel to one another, the first and second corrugated cardboard side walls further extending upwardly from the bottom corrugated cardboard wall and substantially perpendicular to the bottom corrugated cardboard wall; the front wall being coupled to the bottom corrugated cardboard wall and extending upwardly and substantially perpendicular to the bottom corrugated cardboard wall; the front wall having a vertical height less than a vertical height of each of the first and second corrugated cardboard side walls such that the front wall and the first and second corrugated cardboard side walls define an open region therebetween that is sized and shaped to receive the first storage box therethrough; the inflatable cushion being disposed in the storage region of the shelf liner | — 75b |

| Gas pressurization system inflates the inflatable cushion such that the inflatable cushion contacts both the first storage box and the second shelf member and the inflatable cushion applies a downward force on the first storage box to prevent movement of the first storage box during movement of the cargo container housing | — 75q |

| User transports the cargo container from a first location to a second location utilizing a truck adapted to pull the cargo container | — 75c |

FIG. 25

CARGO CONTAINER FOR HOLDING A STORAGE BOX AND METHOD FOR TRANSPORTING THE STORAGE BOX UTILIZING THE CARGO CONTAINER

CROSS-REFERENCE TO RELATED APPLICATIONS

This application is a continuation-in-part of U.S. patent application Ser. No. 14/295,371 filed on Jun. 4, 2014, which claims priority to U.S. Provisional Patent Application No. 61/831,239 filed on Jun. 5, 2013, and the entire contents of both applications are hereby incorporated by reference herein.

BACKGROUND

Consumer fireworks have been generally stored in bulk enclosed containers while transporting the fireworks. While transporting a bulk enclosed container, the fireworks may undesirably move within the bulk enclosed container and become damaged. Further, after transporting the bulk enclosed container, the fireworks are removed from the bulk enclosed container and displayed on tables or shelves in a building or a tent. However, the amount of labor required to (i) fill the bulk containers with fireworks prior to transporting the fireworks, and (ii) to remove the fireworks from the bulk containers after transporting the fireworks and to display and sell the fireworks in the building or the tent is relatively expensive.

Accordingly, the inventor herein has recognized a need for an improved cargo container and method that minimizes and/or eliminates the above-mentioned deficiencies.

SUMMARY

A cargo container for holding at least a first storage box therein in accordance with an exemplary embodiment is provided. The cargo container includes a cargo container housing defining an interior region and having a first consumer entrance extending therethrough. The cargo container further includes a shelving unit disposed in the interior region such that a longitudinally extending aisle is located proximate to the shelving unit in the interior region. The shelving unit has first and second shelf members spaced apart from one another. The shelving unit further includes a shelf liner and an inflatable cushion. The shelf liner is disposed on the first shelf member. The shelf liner has a bottom corrugated cardboard wall, first and second corrugated cardboard side walls, a rear corrugated cardboard wall, and a front wall. The shelf liner defines a storage region for holding the first storage box therein. The first and second corrugated cardboard side walls are disposed on opposite ends of the bottom corrugated cardboard wall and extend substantially parallel to one another. The first and second corrugated cardboard side walls further extend upwardly from the bottom corrugated cardboard wall and substantially perpendicular to the bottom corrugated cardboard wall. The front wall is coupled to the bottom corrugated cardboard wall and extends upwardly and substantially perpendicular to the bottom corrugated cardboard wall. The front wall has a vertical height less than a vertical height of each of the first and second corrugated cardboard side walls such that the front wall and the first and second corrugated cardboard side walls define an open region therebetween that is sized and shaped to receive the first storage box therethrough. The inflatable cushion is disposed in the storage region of the shelf liner and adapted to contact both the first storage box and the second shelf member when the inflatable cushion has an inflated state such that the inflatable cushion applies a downward force on the first storage box to prevent movement of the first storage box on the shelf liner during movement of the cargo container housing.

A method for transporting at least a first storage box utilizing a cargo container in accordance with another exemplary embodiment is provided. The method includes providing a cargo container housing defining an interior region and having a first consumer entrance extending therethrough. The method further includes providing a shelving unit disposed in the interior region such that a longitudinally extending aisle is located proximate to the shelving unit in the interior region. The shelving unit has first and second shelf members spaced apart from one another. The shelving unit further includes a shelf liner and an inflatable cushion. The shelf liner is disposed on the first shelf member. The shelf liner has a bottom corrugated cardboard wall, first and second corrugated cardboard side walls, a rear corrugated cardboard wall, and a front wall. The shelf liner defines a storage region for holding the first storage box therein. The first and second corrugated cardboard side walls are disposed on opposite ends of the bottom corrugated cardboard wall and extend substantially parallel to one another. The first and second corrugated cardboard side walls further extend upwardly from the bottom corrugated cardboard wall and substantially perpendicular to the bottom corrugated cardboard wall. The front wall is coupled to the bottom corrugated cardboard wall and extends upwardly and substantially perpendicular to the bottom corrugated cardboard wall. The front wall has a vertical height less than a vertical height of each of the first and second corrugated cardboard side walls such that the front wall and the first and second corrugated cardboard side walls define an open region therebetween that is sized and shaped to receive the first storage box therethrough. The inflatable cushion is disposed in the storage region of the shelf liner. The method further includes inflating the inflatable cushion utilizing a gas pressurization system such that the inflatable cushion contacts both the first storage box and the second shelf member and the inflatable cushion applies a downward force on the first storage box to prevent movement of the first storage box on the shelf liner during movement of the cargo container housing.

BRIEF DESCRIPTION OF THE DRAWINGS

FIG. 1 is a side view of a cargo container in accordance with an exemplary embodiment;

FIG. 2 is a top view of the cargo container of FIG. 1 with a top wall removed therefrom;

FIG. 18 is a front view of the shelving unit of FIG. 9;

FIG. 19 is an isometric view of a shelf liner utilized in the shelving unit of FIG. 9;

FIG. 20 is a cross-sectional view of the shelf liner of FIG. 19;

FIG. 21 is an enlarged cross-sectional view of a portion of the shelf liner of FIG. 20;

FIG. 25 is a flowchart of a method for transporting at least one storage box utilizing the cargo container of FIG. 7 in accordance with another exemplary embodiment.

DETAILED DESCRIPTION

Figure 3:
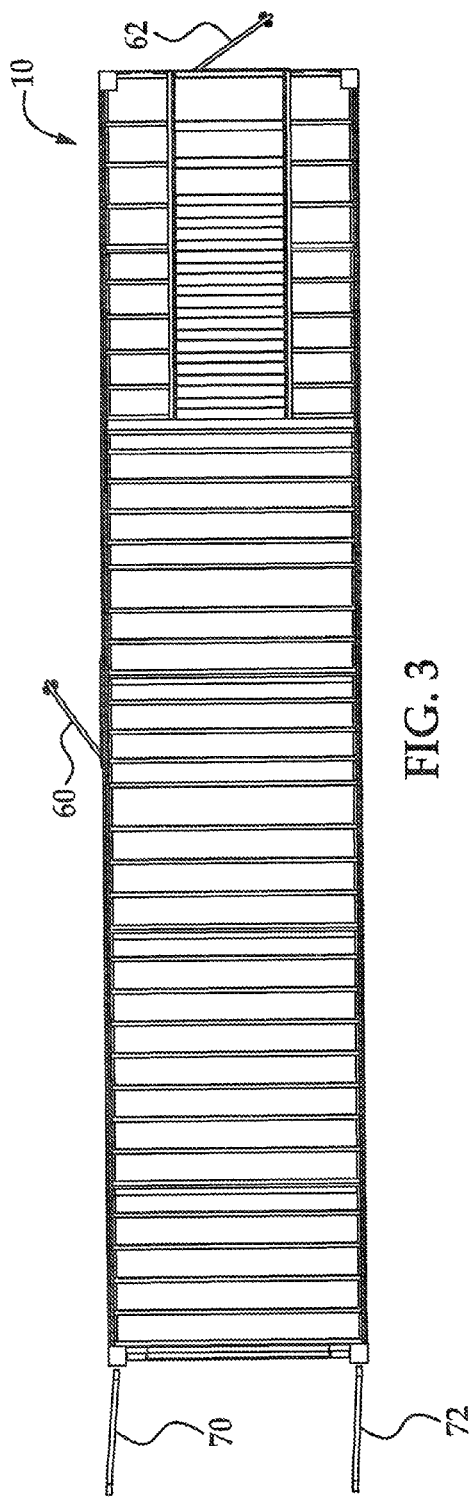
FIG. 3 is bottom view of the cargo container of FIG. 1 with a portion of the bottom wall removed therefrom.
Figure 4:
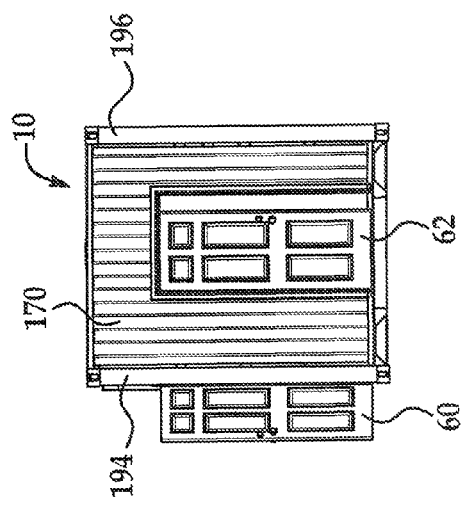
FIG. 4 is an end view of the cargo container of FIG. 1.

Referring to FIGS. 1-4, a cargo container 10 for selling consumer fireworks, in accordance with an exemplary embodiment is provided. The cargo container 10 includes an outer housing 20 (i.e., a cargo container housing), shelving units 30, 32, 34, 36, 40, 42, 44, 46, doors 60, 62, 70, 72, electrical lights 80, 82, 84, exit lights 90, 92, 94, and an entrance sign 100. An advantage of the cargo container 10 is that the container 10 can be transported to multiple locations for selling consumer fireworks at the multiple locations. Another advantage of the cargo container 10 is that the container 10 can securely protect the consumer fireworks stored therein.

A consumer fireworks device is defined as a device for producing a display for entertainment by a combustion of explosive or flammable compositions.

The outer housing 20 defines an interior region 22 for storing the consumer fireworks therein. The outer housing 20 includes a top wall 150, side walls 160, 162, an end wall 170, a bottom wall 184, and support posts 190, 192, 194, 196. In an exemplary embodiment, the outer housing 20 has one of the following dimensions: 19' 4" length×7' 8" width×7' 10" height; 39' 5" length×7' 8" width×7' 10" height; 19' 4" length× 7' 7" width×7' 10" height; 39' 5" length×7' 8" width×8' 10" height; 53' length×8' 6" width×9' 6" height. Of course, the outer housing 20 could have other dimensions that allow consumers to readily enter the outer housing 20.

The first and second side walls 160, 162 extend generally parallel to one another. The first side wall 160 has first and second ends coupled to the support posts 190, 194, respectively. The first side wall 160 includes a consumer entrance 200 extending therethrough. The door 60 is operably and rotatably coupled to the first side wall 160 is configured to selectively enclose the consumer entrance 200.

The second side wall 162 includes first and second ends coupled to the support posts 192, 196, respectively. The second side wall 162 has an exhaust port 201 extending therethrough.

The end wall 170 extends generally perpendicular to the first and second side walls 160, 162. The end wall 170 has first and second ends coupled to the support posts 194, 196, respectively. The end wall 170 includes a consumer entrance 202 extending therethrough. The door 62 is operably and rotatably coupled to the end wall 170 and is configured to selectively enclose the consumer entrance 202.

The top wall 150 is coupled to top ends of the first and second side walls 160, 162. The top wall 150 is configured to support the electrical lights 80, 82, 84 within the interior region 22. The electrical lights 80, 82, 84 are configured to illuminate the interior region 22 of the outer housing 20.

The bottom wall 184 is coupled to bottom ends of the first and second side walls 160, 162 and is provided to support the components of the cargo container 10 within the interior region 22.

Another consumer entrance 204 is disposed between the support posts 190, 192 and is defined by the first and second side walls 160, 162, the top wall 150, and the bottom wall 184. The door 70 is operably and rotatably coupled to the support post 190 and is configured to selectively enclose a portion of the consumer entrance 204. The door 72 is operably and rotatably coupled to the support post 192 and is configured to selectively enclose a portion of the consumer entrance 204.

Figure 5:
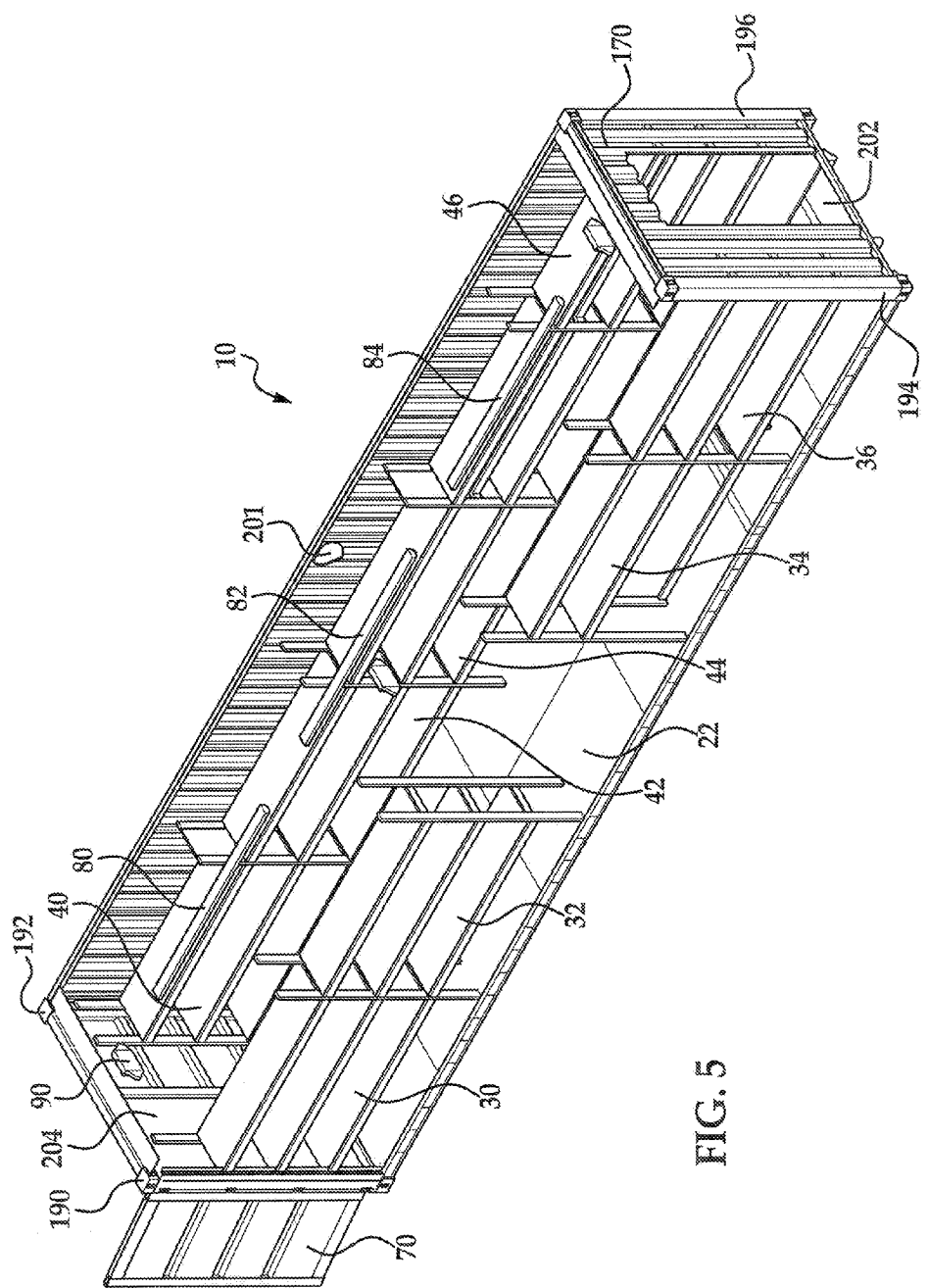
FIG. 5 is an isometric view of a portion of the cargo container of FIG. 1 with a side wall and a top wall removed therefrom.
Figure 6:
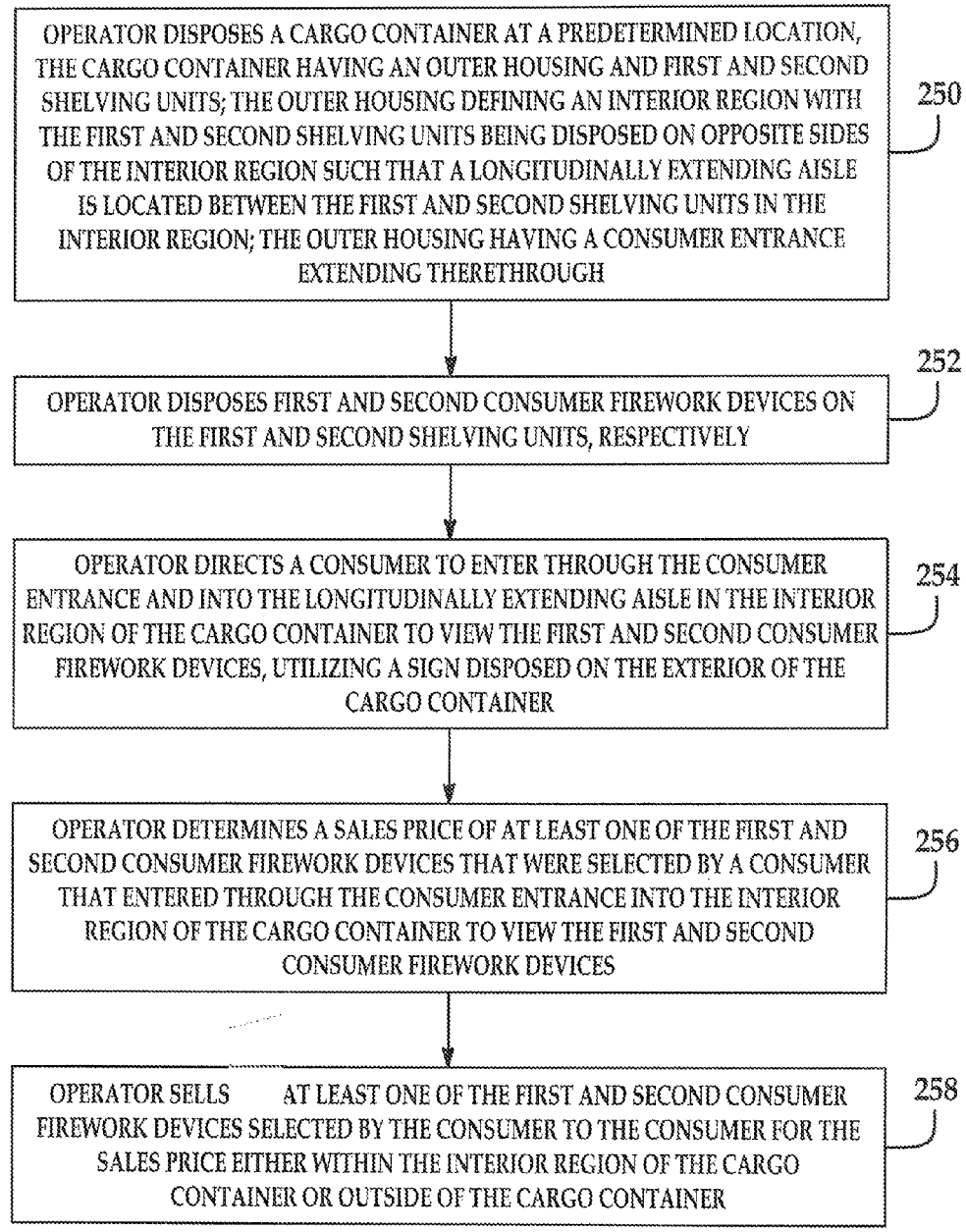
FIG. 6 is a flowchart of a method for selling consumer fireworks in accordance with another exemplary embodiment.

Referring to FIGS. 1, 2, and 5, the shelving units 30-46 are configured to hold consumer fireworks thereon. A first set of shelving units including shelving units 30, 32, 34, 36 are disposed on a first side of the interior region 22 on the bottom wall 184. A second set of shelving units including shelving units 40, 42, 43, 44, 46 are disposed on a second side of the interior region 22 opposite to the first set of shelving units such that a longitudinally extending aisle 240 is located between the first and second sets of shelving units. In one exemplary embodiment, for example, the shelving unit 32 is configured to hold at least a consumer fireworks device 245 thereon. Also, the shelving unit 42 is configured to hold at least a consumer fireworks device 246 thereon. Thus, a consumer walking in the longitudinally extending aisle 240 can view and select the consumer fireworks devices 245, 246 in order to buy the devices 245, 246. In one exemplary embodiment, the longitudinally extending aisle 240 is substantially 4 feet wide and extends substantially an entire longitudinal length of the interior region 22 of the outer housing 20.

In an alternative embodiment, the first set of shelving units 30-36 could be removed from the cargo container 10, or the second set of shelving units 40-46 could be removed from the cargo container 10, such that the longitudinally extending aisle 240 would extend along a longitudinal side of the interior region 22.

The exit light 92 is coupled to the top wall 150 proximate to the consumer entrance 200. Also, the exit light 94 is coupled to the top wall 150 proximate to the consumer entrance 202. Further, the exit light 90 is coupled to the top wall 150 proximate to the consumer entrance 204.

The entrance sign 100 is disposed on an exterior surface of the side wall 160 proximate to the consumer entrance 200. The entrance sign 100 is configured to direct consumers through the consumer entrance 200 into the interior region 22 of the cargo container 10.

Referring to FIGS. 1-6, a flowchart of a method for selling consumer fireworks in accordance with another exemplary embodiment is provided.

At step 250, an operator disposes the cargo container 10 at a predetermined location. The cargo container 10 has the outer housing 20 and the first and second shelving units 32, 42. The outer housing 20 defines an interior region 22 with the first and second shelving units 32, 42 being disposed on opposite sides of the interior region 22 such that a longitudinally extending aisle 240 is located between the first and second shelving units 32, 42 in the interior region 22. The outer housing 20 has the consumer entrance 200 extending therethrough.

At step 252, the operator disposes first and second consumer firework devices 245, 246 on the first and second shelving units 32, 42, respectively.

At step 254, the operator directs a consumer to enter through the consumer entrance 200 and into the longitudinally extending aisle 240 in the interior region 22 of the cargo container 10 to view the first and second consumer firework devices 245, 246, utilizing the entrance sign 100 disposed on the exterior of the cargo container 10. Of course, an alternative embodiment, the consumer could have entered the interior region 22 of the cargo container 10 utilizing the consumer entrance 202 or the consumer entrance 204.

At step 256, the operator determines a sales price of at least one of the first and second consumer firework devices 245, 246 that were selected by the consumer that entered through the consumer entrance 200 into the interior region 22 of the cargo container 10 to view the first and second consumer firework devices 245, 246.

At step 258, the operator sells at least one of the first and second consumer firework devices 245, 246 selected by the consumer to the consumer for the sales price either within the interior region 22 of the cargo container 10 or outside of the cargo container 10.

Figure 7:
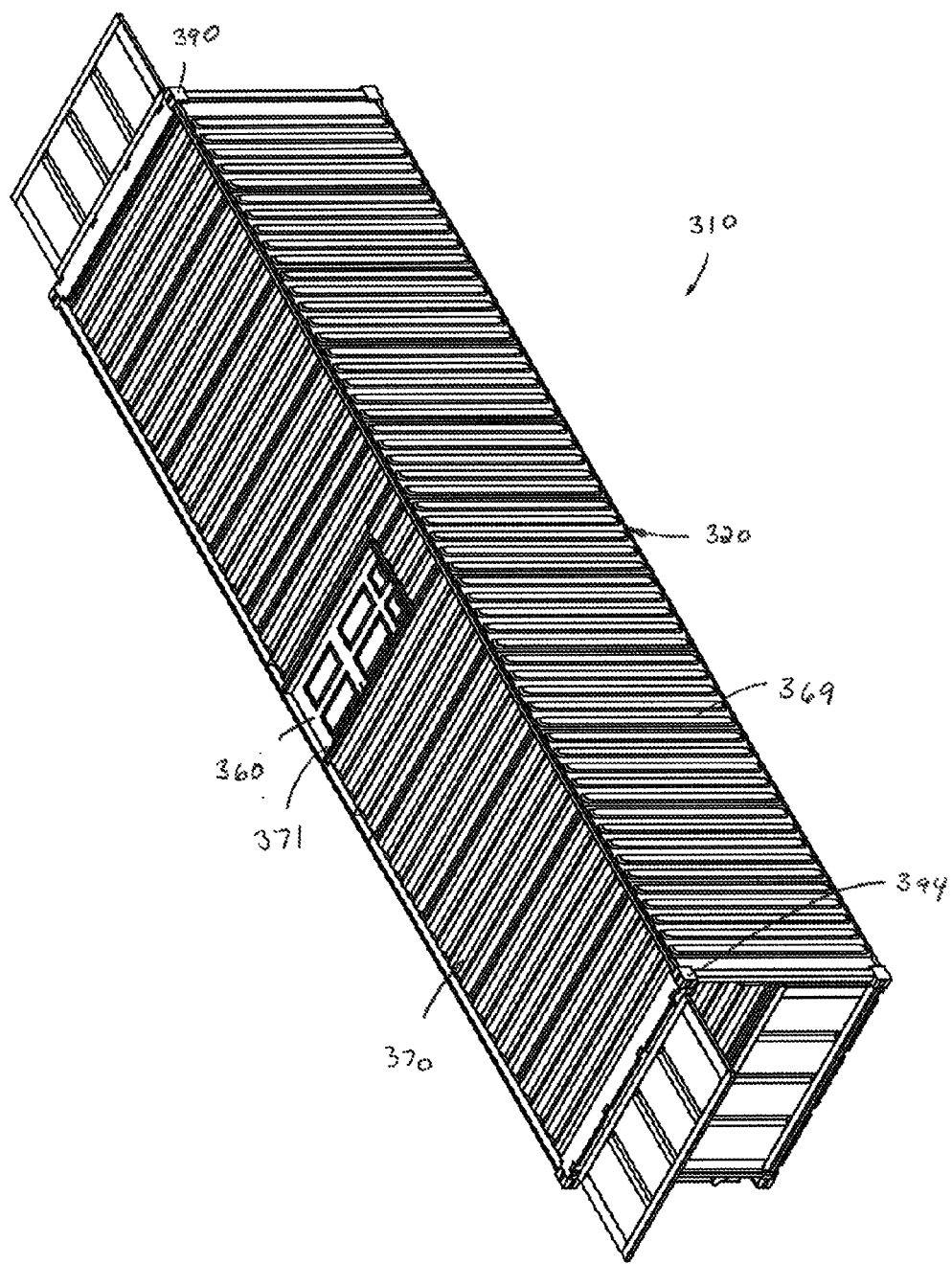
FIG. 7 is an isometric view of a cargo container in accordance with another exemplary embodiment.
Figure 8:
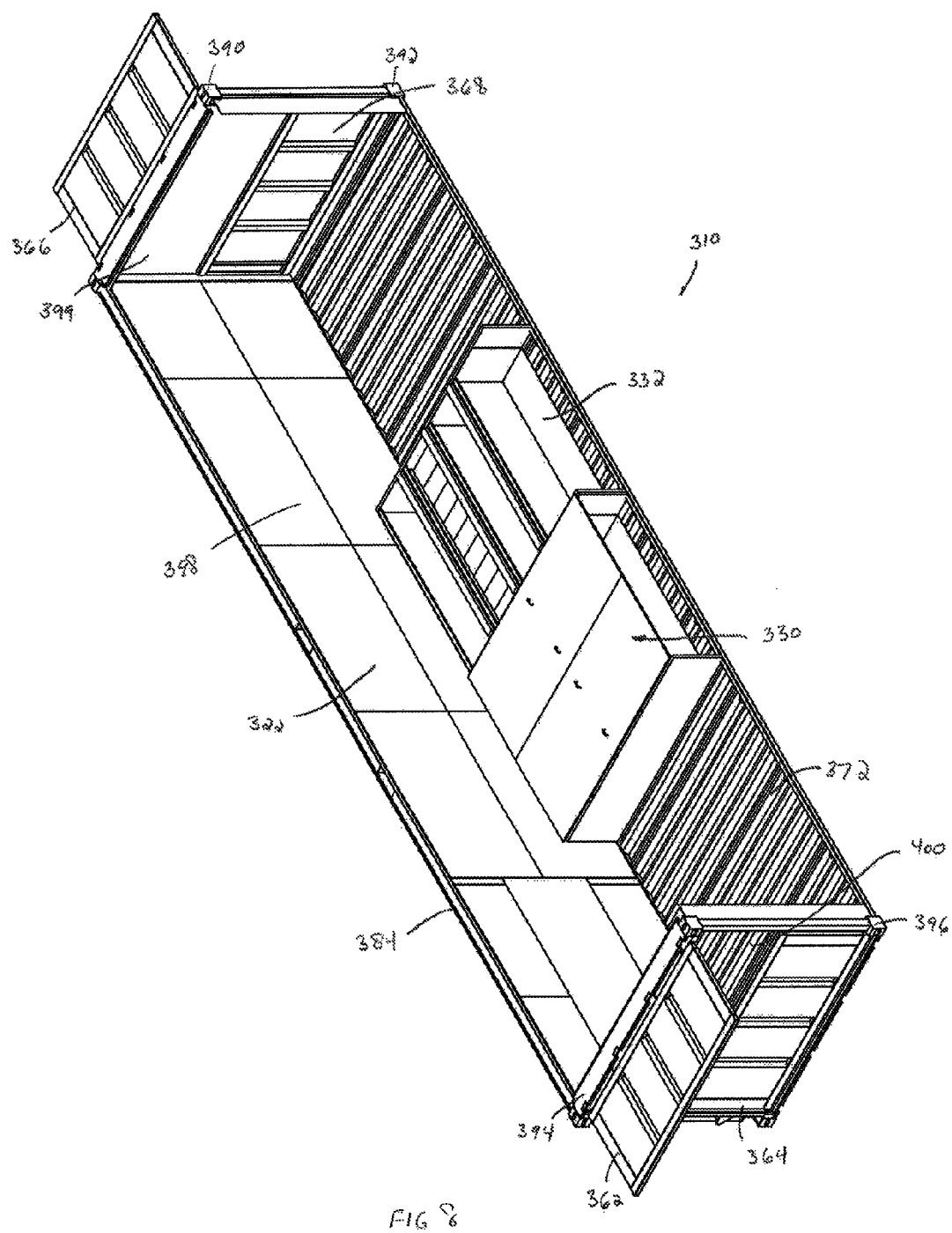
FIG. 8 is an isometric view of a portion of the cargo container of FIG. 7 with a side wall and a top wall removed therefrom.
Figure 9:
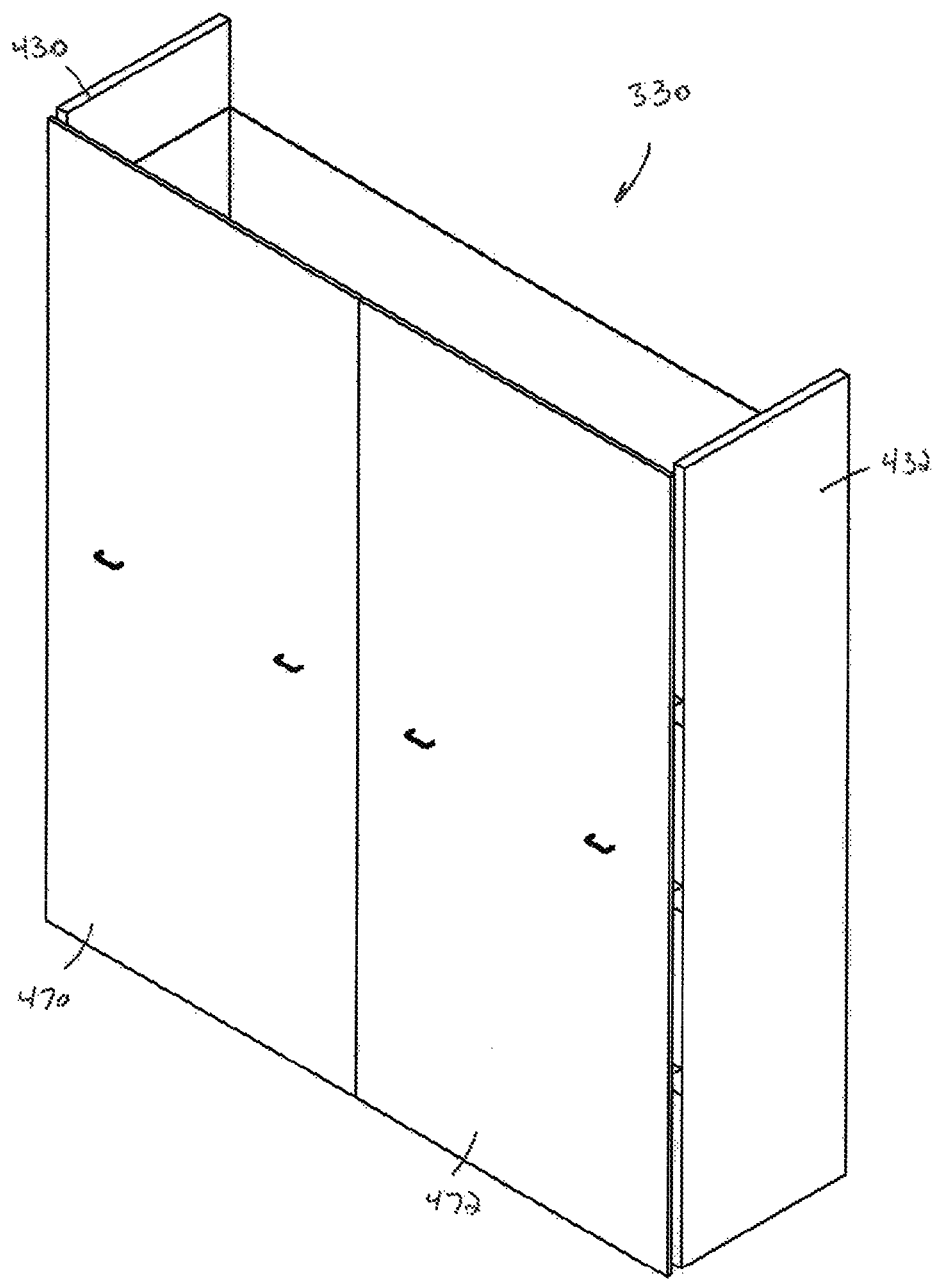
FIG. 9 is an isometric view of a shelving unit utilized in the cargo container of FIG. 7.
Figure 24:
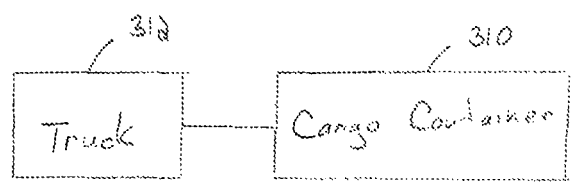
FIG. 24 is a block diagram of a truck utilized to transport the cargo container of FIG. 7.

Referring to FIGS. 7, 8 and 24, a cargo container 310 for transporting, displaying, and selling consumer fireworks, in accordance with another exemplary embodiment is provided. The cargo container 310 includes a cargo container housing 320, shelving units 330, 332, and doors 360, 362, 364, 366, 368.

The cargo container housing 320 defines an interior region 322 for storing storage boxes having consumer fireworks therein. The cargo container housing 320 includes a top wall 369 side walls 370, 372, a bottom wall 384, and support posts 390, 392, 394, 396. In an exemplary embodiment, the cargo container housing 320 has one of the following dimensions: 19' 4" length×7' 8" width×7' 10" height; 39' 5" length×7' 8" width×7' 10" height; 19' 4" length×7' 7" width×7' 10" height; 39' 5" length×7' 8" width×8' 10" height; 53' length×8' 6" width×9' 6" height. Of course, the cargo container housing 320 could have other dimensions that allow consumers to readily enter the outer cargo container housing 320. In an exemplary embodiment, the walls 369, 370, 372, 384 of the cargo container housing 320 are constructed of steel.

Referring to FIGS. 7 and 8, the first and second side walls 370, 372 extend generally parallel to one another. The first side wall 370 has first and second ends coupled to the support posts 390, 394, respectively. The first side wall 370 includes a consumer entrance 371 extending therethrough. The door 360 is operably and rotatably coupled to the first side wall 370 and is configured to selectively enclose the consumer entrance 371. The second side wall 372 includes first and second ends coupled to the support posts 392, 396, respectively.

The top wall 369 is coupled to top ends of the first and second side walls 370, 372. The top wall 369 is configured to support electrical lights within the interior region 322.

The bottom wall 384 is coupled to bottom ends of the first and second side walls 370, 372 and is provided to support the components of the cargo container 310 within the interior region 322.

Referring to FIG. 8, another consumer entrance 399 is disposed between the support posts 390, 392 and is defined by the first and second side walls 370, 372, the top wall 369, and the bottom wall 384. The door 366 is operably and rotatably coupled to the support post 390 and is configured to selectively enclose a portion of the consumer entrance 399. The door 368 is operably and rotatably coupled to the support post 392 and is configured to selectively enclose a portion of the consumer entrance 399.

Another consumer entrance 400 is disposed between the support posts 394, 396 and is defined by the first and second side walls 370, 372, the top wall 369, and the bottom wall 384. The door 362 is operably and rotatably coupled to the support post 394 and is configured to selectively enclose a portion of the consumer entrance 400. The door 364 is operably and rotatably coupled to the support post 396 and is configured to selectively enclose a portion of the consumer entrance 400.

Referring to FIGS. 9-18 and 24, the shelving units 330, 332 (shown in FIG. 8) are provided to store storage boxes thereon and to secure the storage boxes to prevent movement thereof while transporting the cargo container 310 from a first location to a second location utilizing a truck 312 (shown in FIG. 24). The structure of the shelving units 330, 332 are substantially similar to one another and only the structure of the shelving unit 330 will be discussed in greater detail below.

Referring to FIGS. 8, 9, 12 and 14-17, the shelving unit 330 is disposed in the interior region 322 of the cargo container housing 320 such that a longitudinally extending aisle 398 (shown in FIG. 8) is located proximate to the shelving unit 330 in the interior region 322. The shelving unit 330 is provided to store the boxes 403, 404, 405, 406, 407, 408, 409, 410, 412 (shown in FIG. 14) thereon. The shelving unit 330 includes shelf members 422, 424, 426, side walls 430, 432, shelf support brackets 440, 442, 444, shelf liners 450, 452, 454, 456, panel support members 460, 462, 464, removable panels 470, 472, and an inflatable cushion 480.

Figure 16:
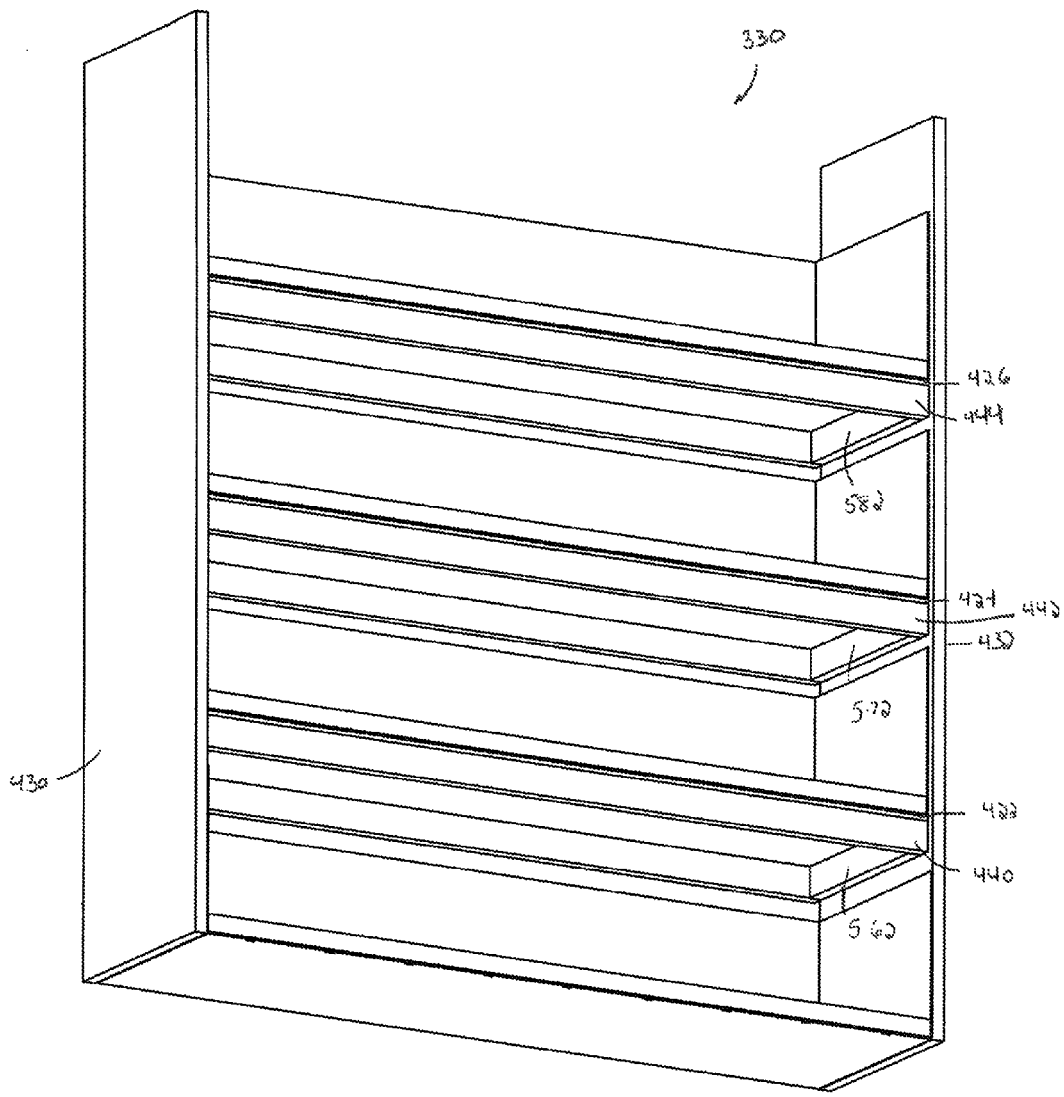
FIG. 16 is another isometric view of the shelving unit of FIG. 9.
Figure 17:
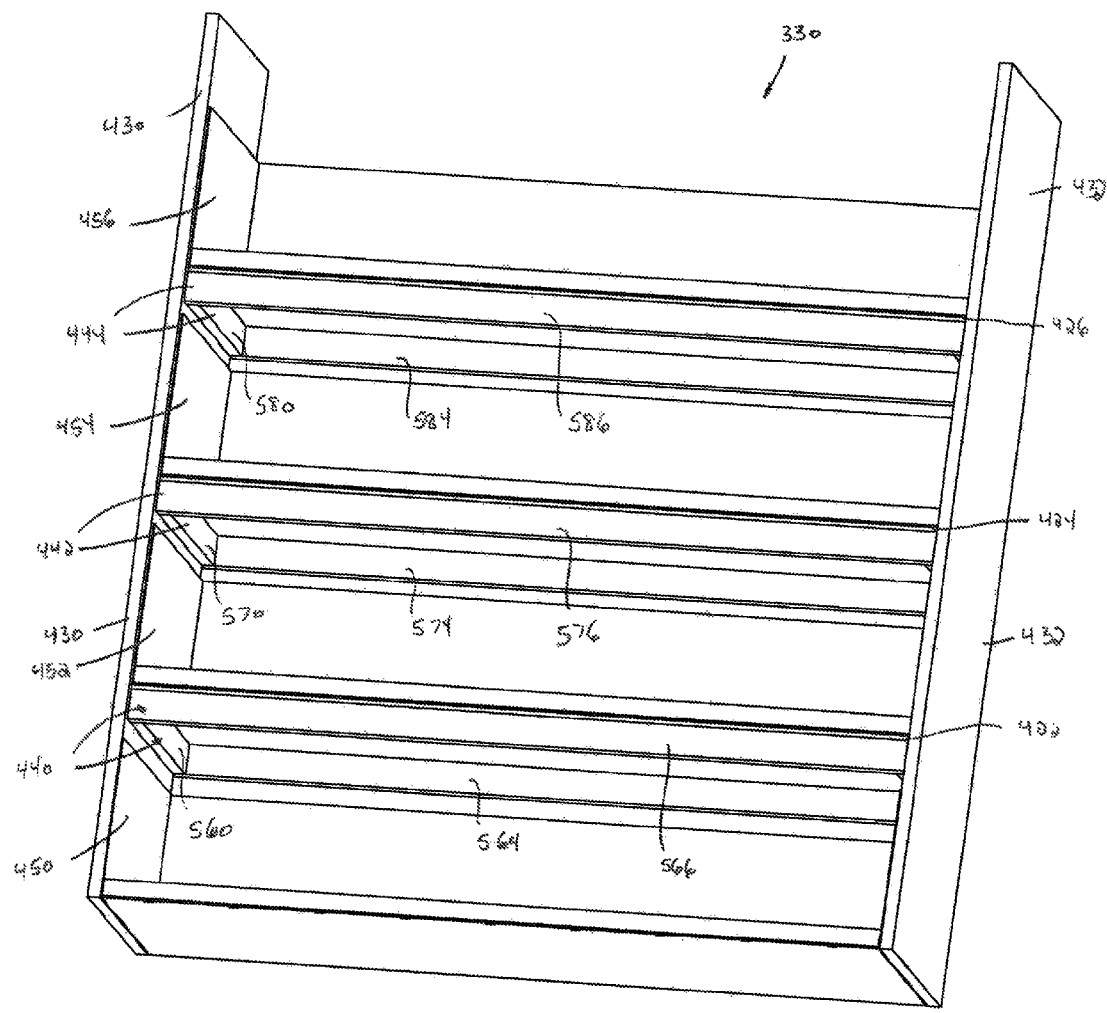
FIG. 17 is another isometric view of the shelving unit of FIG. 9.
Figure 17:
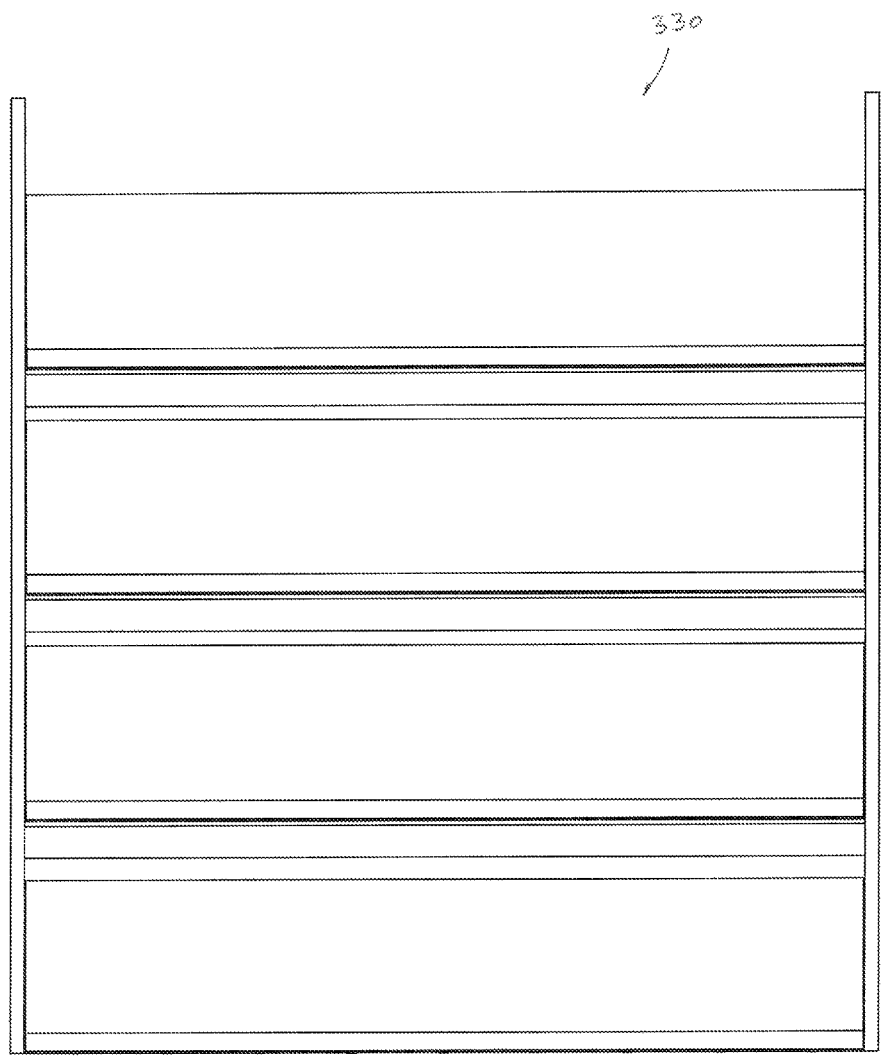
Figure 22:
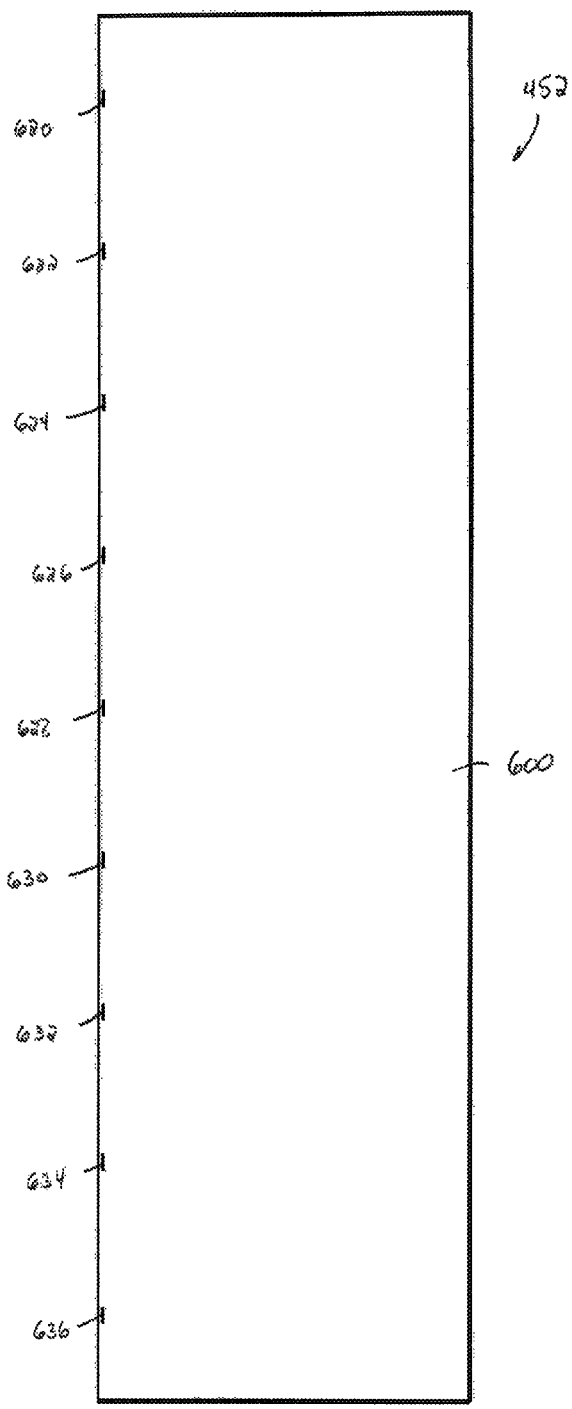
FIG. 22 is a bottom view of the shelf liner of FIG. 19.

Referring to FIGS. 16-18, the shelf members 422, 424, 426 are each coupled between the side walls 430, 432 and are spaced apart from one another. In an exemplary embodiment, the shelf members 422, 424, 426 and the side walls 430, 432 are constructed of particle board or plywood. Of course, the shelf members 422, 424, 426 and the side walls 430, 432 could be constructed of other materials such as wood or plastic for example.

Referring to FIGS. 16 and 17, the shelf support bracket 440 is adapted to support the shelf member 422 thereon. The shell support bracket 440 includes board members 560, 562, 564, 566. The board members 560, 562 are coupled to the side walls 430, 432, respectively. The board member 564 extends between the side walls 430, 432 and are coupled to the side walls 430, 432. Further, the board member 566 extends between the side walls 430, 432 and are coupled to the side walls 430, 432.

The shelf support bracket 442 is adapted to support the shelf member 424 thereon. The shell support bracket 442 includes board members 570, 572, 574, 576. The board members 570, 572 are coupled to the side walls 430, 432, respectively. The board member 574 extends between the side walls 430, 432 and are coupled to the side walls 430, 432. Further, the board member 576 extends between the side walls 430, 432 and are coupled to the side walls 430, 432.

The shelf support bracket 444 is adapted to support the shelf member 426 thereon. The shell support bracket 444 includes board members 580, 582, 584, 586. The board members 580, 582 are coupled to the side walls 430, 432, respectively. The board member 584 extends between the side walls 430, 432 and are coupled to the side walls 430, 432. Further, the board member 586 extends between the side walls 430, 432 and are coupled to the side walls 430, 432.

Referring to FIGS. 14 and 19-22, the shelf liners 450, 452, 454, 456 are provided to hold storage boxes thereon. The shelf members 452, 454, 456 are disposed on the shelf members 422, 424, 246, respectively. The shelf member 450 may be disposed on the bottom wall 384 of the cargo container housing 320. Since the structure of shelf liner 452 is substantially similar to the shelf liners 450, 454, 456, only the structure of the shelf liner 452 will be discussed in greater detail below.

Referring to FIGS. 14 and 19-22, the shelf liner 452 has a bottom corrugated cardboard wall 600, first and second corrugated cardboard side walls 602, 604, a rear corrugated cardboard wall 606, and a front wall 608. The shelf liner 452 defines a storage region 637 (shown in FIG. 20) for holding the storage box 403 (shown in FIG. 14) therein. In an exemplary embodiment, each of the bottom corrugated cardboard wall 600, the first and second corrugated cardboard side walls 602, 604, and the rear corrugated cardboard wall 606 are constructed of a double-walled corrugated cardboard sheet. In an alternative embodiment, the walls 600, 602, 604, 606 could be constructed of another material such as fiberboard, plywood, wood, or plastic, for example. Further, in an alternative embodiment, the walls 600, 602, 604, 606 could be constructed of a different type of cardboard having more than two walls or less than two walls.

The first and second corrugated cardboard side walls 602, 604 are disposed on opposite ends of the bottom corrugated cardboard wall 600 and extend substantially parallel to one another. The first and second corrugated cardboard side walls 602, 604 further extend upwardly from the bottom corrugated cardboard wall 600 and substantially perpendicular to the bottom corrugated cardboard wall 600.

The front wall 608 is coupled to the bottom corrugated cardboard wall 600. In particular, staples 620, 622, 624, 626, 628, 630, 632, 634, 636 (shown in FIG. 22) are disposed through the shelf member 422 (shown in FIG. 22), a water-resistant sealant layer 610, and into the front wall 608 to attach the front wall 608 to the bottom corrugated cardboard wall 600 and to the shelf member 422. The front wall 608 extends upwardly and substantially perpendicular to the bottom corrugated cardboard wall 600. The front wall 608 has a vertical height less than a vertical height of each of the first and second corrugated cardboard side walls 602, 604 such that the front wall 608 and the first and second corrugated cardboard side walls 602, 604 define an open region 639 therebetween that is sized and shaped to receive the storage box 403 (shown in FIG. 14) and storage boxes 404-411 therethrough. In an exemplary embodiment, the front wall 608 is constructed of wood. In an alternative embodiment, the front wall 600 could be constructed of other materials such as plastic or fiberboard or plywood for example.

Figure 13:
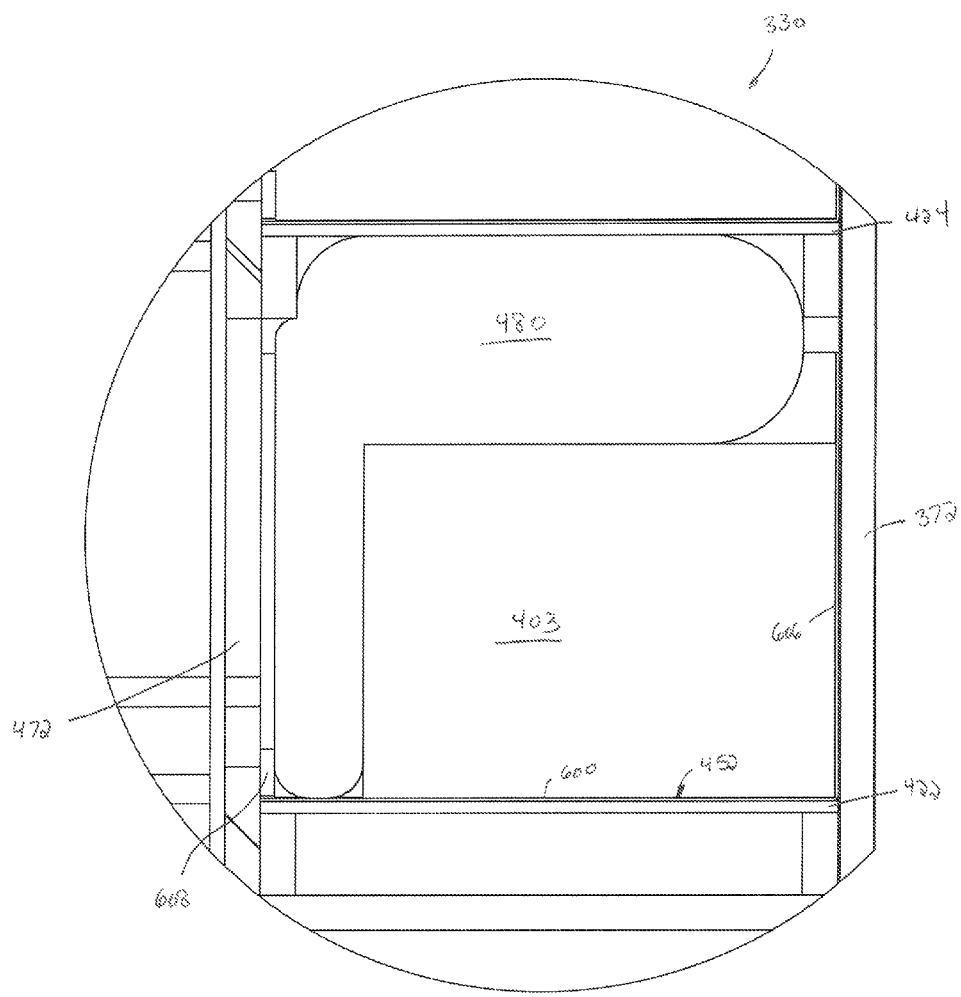
FIG. 13 is an enlarged view of a portion of the cargo container of FIG. 12.
Figure 14:
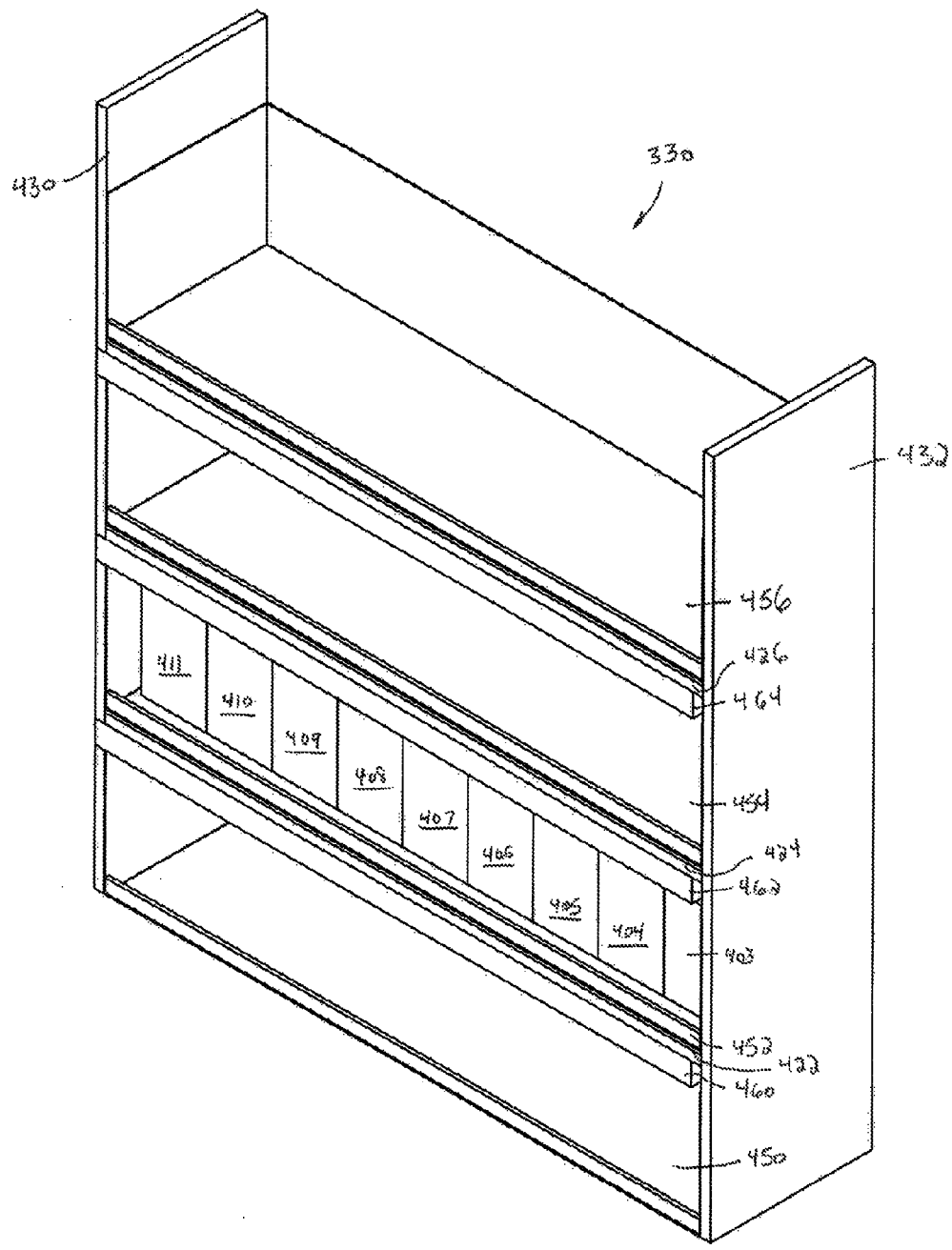
FIG. 14 is an isometric view of a portion of the shelving unit of FIG. 9.

Referring to FIG. 13, during placement of the shelf liner 452 on the shelf member 422, the rear corrugated cardboard wall 606 contacts and is disposed against a wall 372 of the cargo container housing 320.

Referring to FIGS. 10, 12, 14 and 15, the panel support members 460, 462, 464 are adapted to hold the removable panels 470, 472 against the shelf members 422, 424, 426 to hold the storage boxes on the shelf members 422, 424, 426 while transporting the cargo container 310. The panel support members 460, 462, 464 are coupled to and between the side walls 430 432. Further, the panel support members 460, 462, 464 are disposed below and adjacent to the shelf members 422, 424, 426, respectively. The panel support members 460, 462, 464 have upwardly angled surfaces 600, 602, 604 (shown in FIG. 15) configured to engage a corresponding angled surfaces on mounting members on the removable panels 470, 472 to removably hold the removable panels 470, 472 on the panel support members 460, 462, 464.

Figure 10:
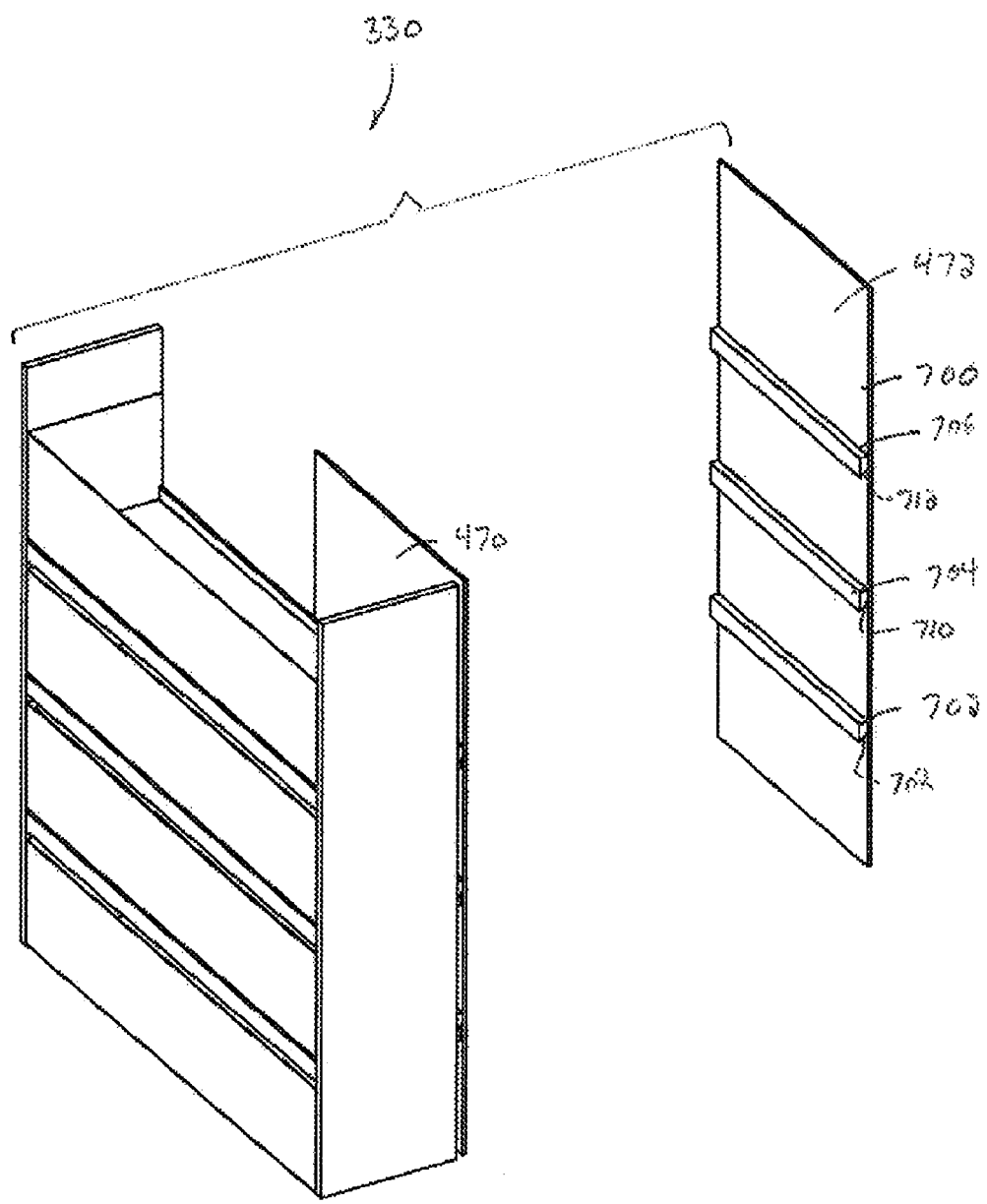
FIG. 10 is a partially exploded view of the shelving unit of FIG. 9.
Figure 11:
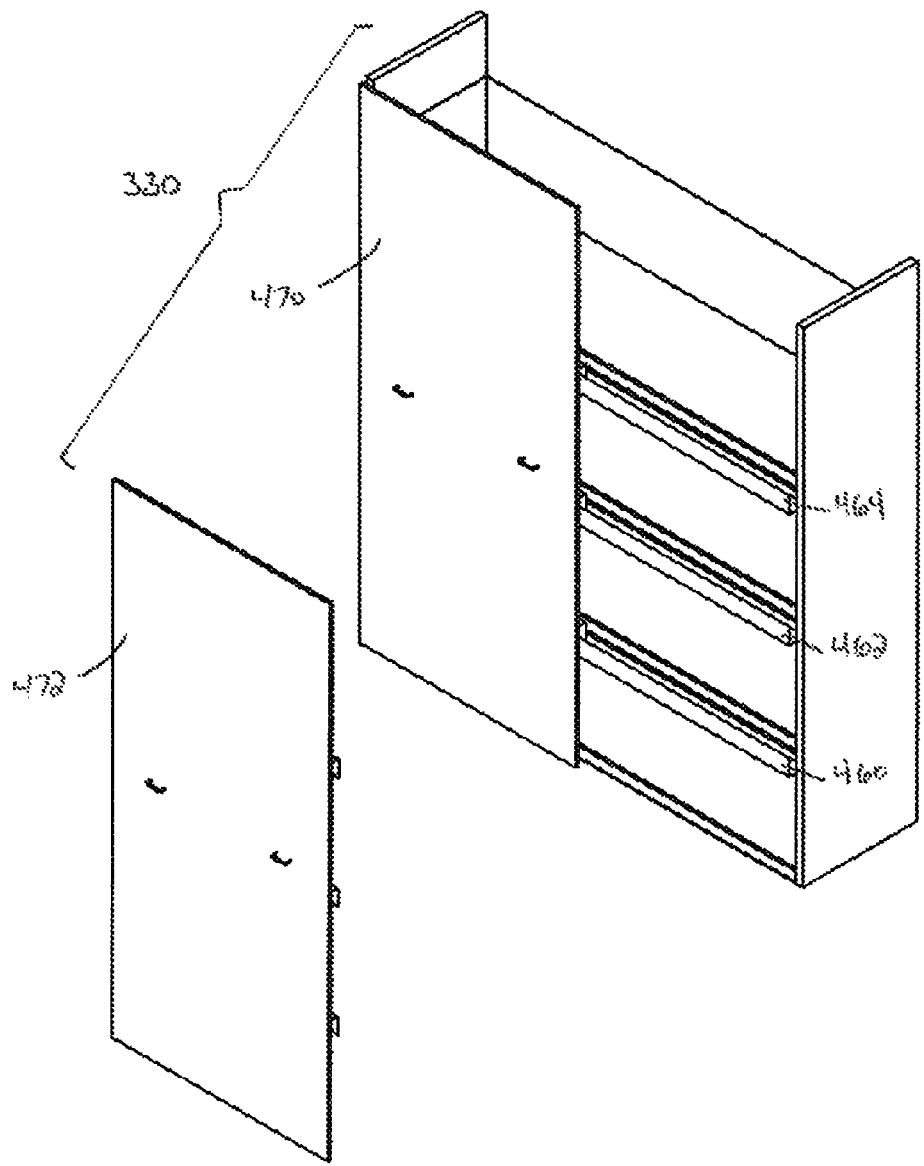
FIG. 11 is another partially exploded view of the shelving unit of FIG. 9.
Figure 12:
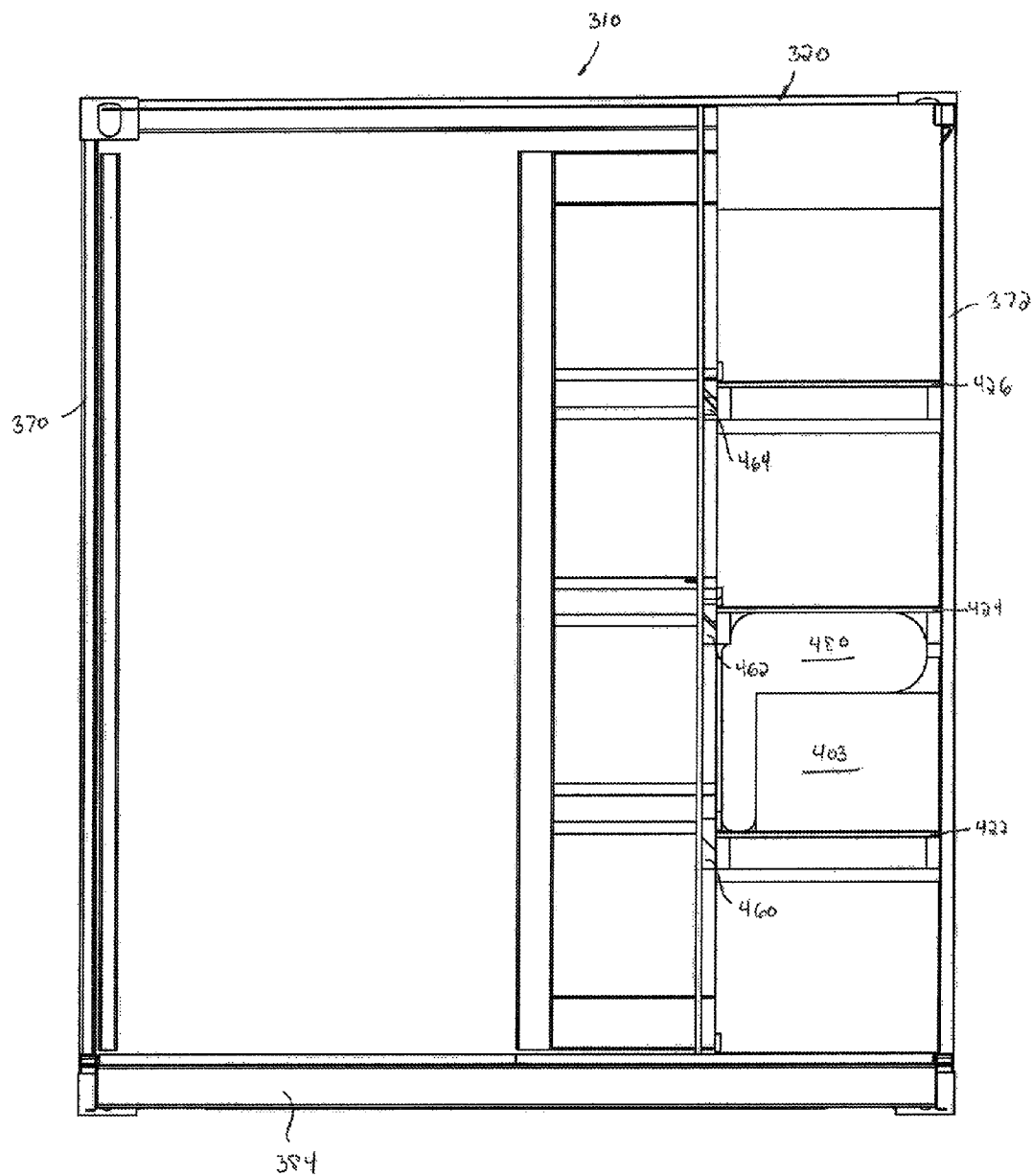
FIG. 12 is a cross-sectional view of the cargo container of FIG. 7.
Figure 15:
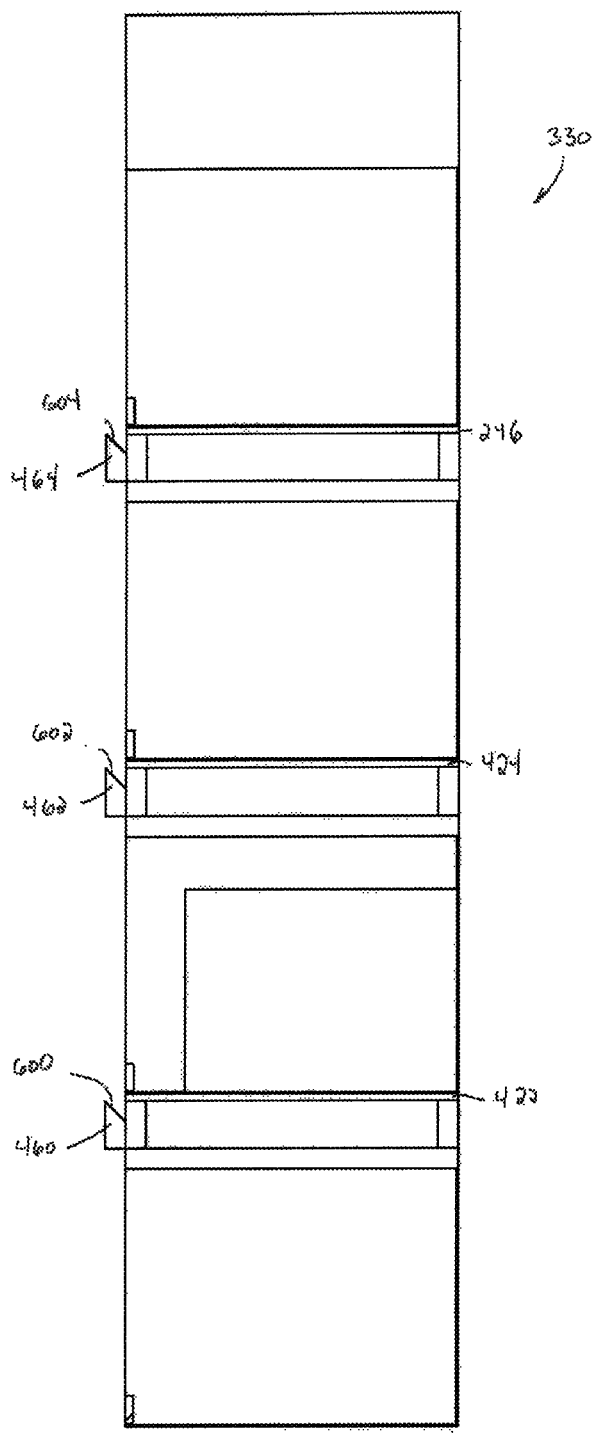
FIG. 15 is a cross-sectional view of the shelving unit of FIG. 14.

Referring to FIGS. 10, 11 and 15, the removable panels 470, 472 are removably coupled to the panel support members 460, 462, 464 discussed above. Since the structure of the removable panels 470, 472 are substantially similar to one another, only the structure of the removable panel 470 will be discussed in greater detail below. The removable panel 470 includes a sheet member 700 and mounting members 702, 704, 706 coupled to the sheet member 700. The mounting members 702, 704, 706 have angled surfaces 708, 710, 712 that are configured to contact engage the angled surfaces 600, 602, 604 (shown in FIG. 15), respectively, of the panel support members 460, 462, 464, respectively.

Referring to FIGS. 12, 13, 20 and 24, it is noted that each of the shelf members 422, 424, 426 would typically have an inflatable cushion disposed proximate to the shelf members 422, 424, 426 for securing storage boxes on the shelf members 422, 424, 426 while transporting the cargo container 310. However, for purposes of simplicity, only the inflatable cushion 480 is shown on the shelving unit 330 and will be explained in greater detail below.

The inflatable cushion 480 is disposed in the storage region 637 (shown in FIG. 20) of the shelf liner 452 and is adapted to contact both the storage box 403 and the upper shelf member 424 when the inflatable cushion 480 has an inflated state such that the inflatable cushion 480 applies a downward force on the storage box 403 to prevent movement of the storage box 403 on the shelf liner 452 during movement of the cargo container housing 320. As shown in FIG. 13, the storage box 403 is disposed on the bottom corrugated cardboard wall 600 of the shelf liner 452 a predetermined distance away from the front wall 608 of the shelf liner 452 such that a gap is formed between the removable panel 472 and the storage box 403 in the storage region 637 (shown in FIG. 20). The inflatable cushion 480 is further adapted to at least partially fill the gap formed between the removable panel 472 and the storage box 403 such that the inflatable cushion 480 applies a force on the storage box 403 in a first direction extending from the removable panel 472 toward the rear corrugated cardboard wall 606 of the shelf liner 452 to prevent movement of the storage box 403 on the shelf liner 452 during movement of the cargo container housing 320.

Figure 23:
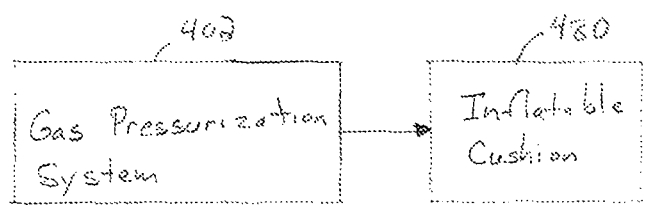
FIG. 23 is a block diagram of a gas pressurization system coupled to an inflatable cushion utilized in the shelving unit of FIG. 9.

Referring to FIG. 23, a gas pressurization system 402 is fluidly coupled to the inflatable cushion 480. The gas pressurization system 402 is adapted to route a gas into an interior of the inflatable cushion 480 to transition the inflatable cushion 480 from a non-inflated state to the inflated state. The gas pressurization system 402 can also selectively deflate the inflatable cushion 480 based on an input from a user.

Referring to FIGS. 7, 12, 13, 19 and 25, a method for transporting at least one storage box utilizing the cargo container 310 in accordance with another exemplary embodiment will now be explained.

At step 750, a user provides the cargo container housing 320 defining an interior region 322 and having the consumer entrance 371 (shown in FIG. 7) extending therethrough.

At step 752, the user provides the shelving unit 330 disposed in the interior region 322 such that a longitudinally extending aisle 398 (shown in FIG. 8) is located proximate to the shelving unit 330 in the interior region 322. The shelving unit 330 has shelf members 422, 424 spaced apart from one another. The shelving unit 330 further includes the shelf liner 452 and the inflatable cushion 480. The shelf liner 452 is disposed on the shelf member 422. The shelf liner 452 has the bottom corrugated cardboard wall 600, first and second corrugated cardboard side walls 602, 604, the rear corrugated cardboard wall 606, and the front wall 608. The shelf liner 452 defines a storage region 637 (shown in FIG. 20) for holding the storage box 403 therein. The first and second corrugated cardboard side walls 602, 604 are disposed on opposite ends of the bottom corrugated cardboard wall 600 and extend substantially parallel to one another. The first and second corrugated cardboard side walls 602, 604 further extend upwardly from the bottom corrugated cardboard wall 600 and substantially perpendicular to the bottom corrugated cardboard wall 600. The front wall 608 is coupled to the bottom corrugated cardboard wall 600 and extends upwardly and substantially perpendicular to the bottom corrugated cardboard wall 600. The front wall 608 has a vertical height less than a vertical height of each of the first and second corrugated cardboard side walls 602, 604 such that the front wall 608 and the first and second corrugated cardboard side walls 602, 604 define an open region 639 (shown in FIG. 19) therebetween that is sized and shaped to receive the storage box 403 therethrough. The inflatable cushion 480 is disposed in the storage region of the shelf liner 452.

At step 754, the gas pressurization system 402 (shown in FIG. 23) inflates the inflatable cushion 480 such that the inflatable cushion 480 contacts both the storage box 403 and the shelf member 424 and the inflatable cushion 480 applies a downward force on the storage box 403 to prevent movement of the storage box 403 during movement of the cargo container housing 320.

At step 756, the user transports the cargo container 310 from a first location to a second location utilizing the truck 312 adapted to pull the cargo container 310.

The cargo container for holding a storage box and the method for transporting the storage box utilizing the cargo container provides a substantial advantage over other containers and methods. In particular, the cargo container utilizes a shelf liner configured to hold a storage box thereon, and inflatable cushion which holds the storage box in a desired location during movement of the cargo container. The cargo container in the shelf liner are particularly useful for transporting boxes containing consumer fireworks.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A cargo container for holding at least a first storage box therein, comprising:
    a cargo container housing defining an interior region and having a first consumer entrance extending therethrough;
    a shelving unit disposed in the interior region such that a longitudinally extending aisle is located proximate to the shelving unit in the interior region; the shelving unit having first and second shelf members spaced apart from one another; the second shelf member being disposed above the first shelf member, the shelving unit further having a shelf liner and an inflatable cushion;
    the shelf liner being disposed on the first shelf member, the shelf liner having a bottom corrugated cardboard wall, first and second corrugated cardboard side walls, a rear corrugated cardboard wall, and a front wall; the shelf liner defining a storage region for holding the first storage box therein;
    the first and second corrugated cardboard side walls being disposed on opposite ends of the bottom corrugated cardboard wall and extending substantially parallel to one another, the first and second corrugated cardboard side walls further extending upwardly from the bottom corrugated cardboard wall and substantially perpendicular to the bottom corrugated cardboard wall;
    the front wall being coupled to the bottom corrugated cardboard wall and extending upwardly and substantially perpendicular to the bottom corrugated cardboard wall; the front wall having a vertical height less than a vertical height of each of the first and second corrugated cardboard side walls such that the front wall and the first and second corrugated cardboard side walls define an open region therebetween that is sized and shaped to receive the first storage box therethrough;
    the inflatable cushion being disposed in the storage region of the shelf liner, and the inflatable cushion being sized and shaped to contact both a top outer surface of the first storage box and the second shelf member when the inflatable cushion has an inflated state such that the inflatable cushion applies a downward force on the top outer surface of the first storage box to prevent movement of the first storage box on the shelf liner during movement of the cargo container housing, the inflatable cushion being further sized and shaped to contact a front outer surface of the first storage box to apply a force on the front outer surface of the first storage box in a first direction extending from the front wall of the shelf line toward the rear corrugated cardboard wall of the shelf liner to hold the first storage box between the inflatable cushion and the rear corrugated cardboard wall of the shelf liner to prevent movement of the first storage box on the shelf liner during movement of the cargo container housing; and
    a gas pressurization system fluidly coupled to the inflatable cushion, the gas pressurization system adapted to pressurize a gas to inflate the inflatable cushion to transition the inflatable cushion from a non-inflated state to the inflated state.

2. The cargo container of claim 1, wherein shelving unit further includes first and second side walls; the first shelf member being coupled to and between the first and second side walls, the second shelf member being coupled to and between the first and second side walls.

3. The cargo container of claim 1, wherein shelving unit further includes:
a first removable panel that encloses at least a portion of the open region of the shelf liner proximate to the front wall of the shelf liner;
the first storage box being disposed on the bottom corrugated cardboard wall of the shelf liner a predetermined distance away from the front wall of the shelf liner such that a gap is formed between the first removable panel and the first storage box in the storage region; and
the inflatable cushion being further adapted to at least partially fill the gap formed between the first removable panel and the first storage box such that the inflatable cushion applies the force on the first storage box in the first direction extending from the first removable panel toward the rear corrugated cardboard wall of the shelf liner to prevent movement of the first storage box on the shelf liner during movement of the cargo container housing.

4. The cargo container of claim 3, wherein the rear corrugated cardboard wall contacts and is disposed against a wall of the cargo container housing.

5. The cargo container of claim 1, wherein the front wall of the shelf liner is constructed of at least one of wood and plastic.

6. The cargo container of claim 5, wherein at least one staple extends through a portion of the front wall of the shelf liner and a portion of the first shelf member to couple the front wall to the first shelf member.

7. The cargo container of claim 6, wherein a water-resistant sealant layer is coupled to and between the front wall of the shelf liner and the bottom corrugated cardboard wall of the shelf liner.

8. The cargo container of claim 1, wherein each of the bottom corrugated cardboard wall, the first and second corrugated cardboard side walls, and the rear corrugated cardboard wall are constructed of a double-walled corrugated cardboard sheet.

9. The cargo container of claim 1, wherein the shelf liner being further adapted to hold a second storage box within the storage region defined by the shelf liner.

10. The cargo container of claim 9, wherein the inflatable cushion being further adapted to contact both the second storage box and the second shelf member when the inflatable cushion has the inflated state such that the inflatable cushion applies the downward force on the second storage box to prevent movement of the second storage box on the shelf liner during movement of the cargo container housing.

11. The cargo container of claim 1, wherein the first storage box is adapted to hold firework devices therein.

12. A method for transporting at least a first storage box utilizing a cargo container, comprising:
providing a cargo container housing defining an interior region, the cargo container having a first consumer entrance at a first end of the cargo container and a second consumer entrance at a second end of the cargo container, the cargo container further having first and second doors selectively enclosing the first consumer entrance, the cargo container further having third and fourth doors selectively enclosing the second consumer entrance;
providing a shelving unit disposed in the interior region such that a longitudinally extending aisle is located proximate to the shelving unit in the interior region; the shelving unit having first and second shelf members spaced apart from one another; the shelving unit further having a shelf liner and an inflatable cushion; the shelf liner being disposed on the first shelf member, the shelf liner having a bottom corrugated cardboard wall, first and second corrugated cardboard side walls, a rear corrugated cardboard wall, and a front wall; the shelf liner defining a storage region for holding the first storage box therein; the first and second corrugated cardboard side walls being disposed on opposite ends of the bottom corrugated cardboard wall and extending substantially parallel to one another, the first and second corrugated cardboard side walls further extending upwardly from the bottom corrugated cardboard wall and substantially perpendicular to the bottom corrugated cardboard wall; the front wall being coupled to the bottom corrugated cardboard wall and extending upwardly and substantially perpendicular to the bottom corrugated cardboard wall; the front wall having a vertical height less than a vertical height of each of the first and second corrugated cardboard side walls such that the front wall and the first and second corrugated cardboard side walls define an open region therebetween that is sized and shaped to receive the first storage box therethrough; and the inflatable cushion being disposed in the storage region of the shelf liner; and
inflating the inflatable cushion utilizing a gas pressurization system that pressurizes a gas to inflate the inflatable cushion such that the inflatable cushion contacts both a top outer surface of the first storage box and the second shelf member and the inflatable cushion applies a downward force on the top outer surface of the first storage box to hold the first storage box between the inflatable cushion and the bottom corrugated cardboard wall of the shelf liner to prevent movement of the first storage box on the shelf liner during movement of the cargo container housing;
transporting the cargo container from a first location to a second location utilizing a truck adapted to pull the cargo container; and
deflating the inflatable cushion utilizing the gas pressurization system.

13. The method of claim 12, wherein the first storage box is adapted to hold firework devices therein.

14. The method of claim 12, wherein the inflatable cushion being further sized and shaped to contact a front outer surface of the first storage box to apply a force on the front outer surface of the first storage box in a first direction extending from the front wall of the shelf liner toward the rear corrugated cardboard wall of the shelf liner to hold the first storage box between the inflatable cushion and the rear corrugated cardboard wall of the shelf liner to prevent movement of the first storage box on the shelf liner during movement of the cargo container housing.

\* \* \* \* \*